United States Patent [19]
Savall et al.

[11] 3,799,350
[45] Mar. 26, 1974

[54] FLOTATION APPARATUS
[75] Inventors: Vincent Savall, Saint Cloud; Pierre Treille, Velizy, both of France
[73] Assignee: Degremont Societe Generale D'Epuration & D'Assainissement, Rueil Malmaison, France
[22] Filed: Mar. 22, 1972
[21] Appl. No.: 237,004

[30] Foreign Application Priority Data
Apr. 5, 1971  France .................. 71.11875

[52] U.S. Cl. ............. 210/221, 209/170, 261/121 R
[51] Int. Cl. .................................. B03d 1/24
[58] Field of Search ...... 209/168, 169, 170; 210/13, 210/44, 221; 261/87, 93, 121 R

[56] References Cited
UNITED STATES PATENTS
| | | | |
|---|---|---|---|
| 3,679,056 | 7/1972 | Haymore | 210/221 |
| 3,306,449 | 2/1967 | Minegishi | 210/221 X |
| 3,446,488 | 5/1969 | Mail et al | 210/221 X |
| 3,645,892 | 2/1972 | Schulman | 210/221 X |
| 1,383,321 | 7/1921 | Marcy | 261/121 R |
| 3,175,687 | 3/1965 | Jones | 210/44 X |

Primary Examiner—John Adee
Assistant Examiner—Robert H. Spitzer
Attorney, Agent, or Firm—Wenderoth, Lind & Ponack

[57] ABSTRACT

A flotation apparatus comprises essentially a parallelepipedic tank disposed horizontally and provided along its major axis with open-top, potlike injectors for the liquid to be treated with another liquid saturated with gas under pressure. The liquid to be treated is delivered through the bottom and preferably centrally of each injector, and the treatment liquid is supplied through a lateral, eccentric but non-tangential pipe. Siphonal means are provided along the major side walls of the tank and are adapted, in conjunction with the injectors, to create outward and downward fluid flow passing under the siphonal means, other means being provided for removing the top sludge from one end of the tank.

3 Claims, 2 Drawing Figures

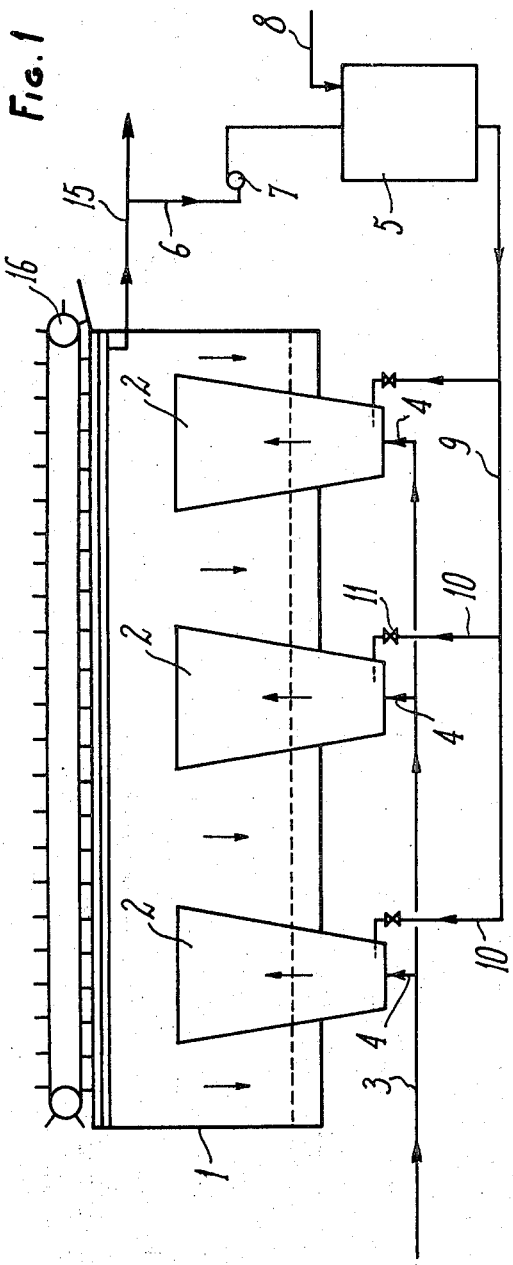
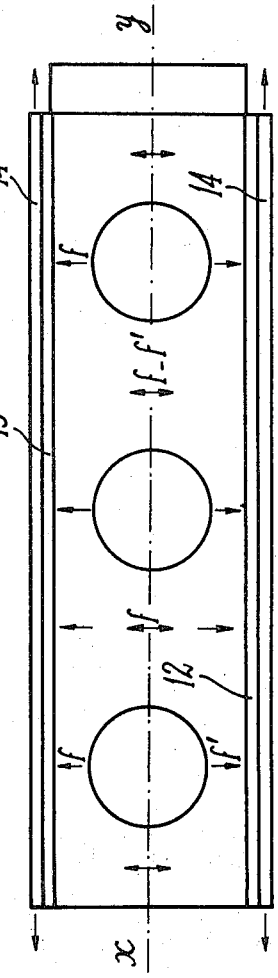

3,799,350

FLOTATION APPARATUS

BACKGROUND OF THE INVENTION

The present invention relates to an apparatus for the treatment of liquids by the so-called flotation process, wherein the flotation is carried out by using a treatment liquid saturated with a gas under pressure expanded before its ingress into the apparatus. This apparatus is particularly useful for purifying liquids such as water.

Many flotation apparatus operating by the expansion of a liquid saturated with gas under pressure involving the release of fine bubbles have already been proposed. These known apparatus are of substantially cylindrical or parallelepipedic configuration.

In cylindrical devices the liquid saturated with gas under pressure is fed centrally, the treated liquid being discharged through a device disposed concentrically to the cylinder wall. These devices provide a perfect hydraulic flow in the case of moderate to medium output values, up to about 100 cubic meters per hour. However, their construction cost becomes extremely high when huge apparatus capable of treating larger outputs, i.e., of the order of more than 500 cu.m./hr., are contemplated. Another inconvenience of these cylindrical apparatus lies in the difficult sludge extraction, notably when very dense fluids are introduced into them.

In parallelepipedic devices the liquid saturated with gas under pressure is introduced at one end of the flotation vessel, either into a compartment completely isolated from the tank proper, or into a compartment separated from the tank by a truncated partition having its upper edge well below the liquid surface. The liquid circulates in the longitudinal direction of the tank; the treated liquid is tapped at the other end of the tank by means of a header, for example a siphonal partition or the like. Since the liquid flows through the narrowest section, the flow rate is particularly high, so that it is rather difficult to avoid the formation of eddies and other turbulence effects, and therefore to obtain satisfactory flow conditions. If liquids having a high impurity content have to be treated, good results cannot be obtained through the flotation process unless tanks of relatively great length are used.

However, these parallelepipedic tanks are advantageous in that their construction is greatly simplified and their cost reduced accordingly. Moreover, the sludge can be collected therefrom in a simple yet efficient manner.

SUMMARY OF THE INVENTION

The devices according to this invention avoids at the same time the inconvenience characterising cylindrical apparatus (i.e., difficult sludge removal having a noxius influence on the treatment efficiency, and high constructional cost), and the inconvenience characterising parallelepipedic devices (i.e., difficult flow and considerable overall dimensions) while preserving their specific advantages and affording particularly good results by applying the flotation process even with liquids having a very high impurity percentage, and fragile flocks, irrespective of the output contemplated. Moreover, the apparatus according to this invention has reduced overall dimensions and a relatively low cost.

The apparatus according to this invention has a parallelepipedic configuration and a rectangular horizontal section and further comprises means for injecting the liquid to be treated and the pressurized treatment liquid, which means are disposed along the major axis of the apparatus, and other means for collecting the treated liquid, which other means are disposed at spaced intervals along the major sides of the apparatus.

As a consequence of the arrangement of this invention the liquid to be treated and its flotation agent introduced into the apparatus are distributed and divided into two streams having opposite directions and each directed towards a major side of the apparatus, whereby, due to the further division of the stream into two diametrally opposed sections the transverse stream has the lowest possible intensity. If, furthermore, the means for introducing the liquid to be treated and its flotation agent are by themselves of a design capable of avoiding as far as possible the creation of eddies or any turbulence in the apparatus, the "quietness" conditions necessary for an optimum flotation will be obtained.

The various features and advantages of this invention will appear as the following description proceeds with reference to the attached drawings illustrating diagrammatically by way of example a typical form of one embodiment of the invention. Of course, other shapes, proportions and relative arrangements of the component elements may be contemplated in actual practice without departing from the basic principle of the invention.

BRIEF DESCRIPTION OF THE DRAWINGS

In the following description, referencce will be made to the attached drawing, in which:

FIG. 1 is a diagrammatic view in axial vertical and longitudinal section, of an apparatus constructed according to the teachings of this invention, and FIG. 2 is a plan view from above of the same apparatus.

DETAILED DESCRIPTION OF THE INVENTION

The apparatus illustrated comprises essentially a parallelepipedic tank 1 having a rectangular horizontal section.

In this tank 1 are disposed at spaced longitudinal intervals, along the major axis $x$–$y$, a plurality of means for injecting the liquid to be treated, i.e., in the exemplary application contemplated herein water and treatment liquid, namely treated water saturated with a gas under pressure such as air. Advantageously, these means may consist of so-called "injection pots" disclosed in a prior patent application No. 205,140 filed Dec. 6, 1971.

These injection pots 2 of frustoconical configuration are supplied with water to be treated through a common feed line 3 comprising branch pipes 4 leading into each injection pot. Moreover, these injection pots are supplied with flotation agent, in this case treated water derived from the outlet of the apparatus and saturated with air under pressure in a pressurizing vessel 5 connected on the one hand to the treated-water line 6 in which a pump 7 is inserted and on the other hand through a pipe line 8 to a source of compressed air (not shown). Thus, a pipe line 9 connects this pressurizing vessel 5 to the injection pots 2 in order to deliver thereto pressurized water through branch ducts 10 equipped with valve or other means 11 adapted to expand the air before introducing the same into the pots.

As a consequence of the air bubbles released in the liquid contained in injection pots 2 the solid particles in suspension therein accumulate at the surface of the flotation tank. The purified water flows downwardly into in this tank, passes under the lower edge of longitudinal siphonal partitions 12/13 disposed on either side of the major side walls of the tank, and rises to the top of the tank. The purified water is recovered in troughs such as 14 connected to outlet ducts such as 15 for directing the desired fraction of treated water to the pressurizing vessel 5. The surface sludge is removed by known means 16 disposed preferably in the longitudinal direction, and this sludge is discharged for example from one end of the tank 1.

With the specific arrangement according to the present invention the collecting means comprising the siphonal partitions 12, disposed on either side of the injection pots 2 along the two major sides of the tank, the liquid will flow both laterally and vertically upwardly, i.e., in the largest cross-sectional area of the flotation tank, the liquid output being divided (as illustrated by the arrows in the drawing) into two equal homogeneous sections or streams directed towards the bottom of each siphonal partition. Under these conditions the turbulence and flow rate are relatively low, the flock separates more easily and the flotation efficiency is particularly high.

Of course, a plurality of tanks of the type described and illustrated herein may be juxtaposed, if desired, the single-tank arrangement illustrated being given by way of illustration only. In fact, it will readily occur to those conversant with the art that this invention should not be construed as being strictly limited to the present example, since various modifications may be brought thereto without departing from the basic principle of the invention. Thus, other means may be used whether for introducing the liquid to be treated and the treatment or flotation fluid, or for collecting the treated liquid and the sludge or solid particles, the specific nature of these means being immaterial, provided that as far as the means for collecting the treated liquid are concerned these are disposed along the major sides of the tank structure.

The apparatus according to this invention is particularly suited for the flotation of industrial or town residual waters, and also for the clarification treatment of drinking water or industrial water.

We claim:

1. In a flotation apparatus for treating liquids by the use of a treatment liquid saturated with a gas under pressure, such gas expanding prior to its entry into the apparatus, said apparatus comprising:

a treatment tank of rectangular cross-section, said tank having a base, a pair of parallel opposite major walls and a pair of parallel opposite minor walls;

a plurality of injection means, spaced uniformly along said base in a line equally spaced from and parallel to said major walls, for introducing perpendicularly through said base and into said tank said liquid to be treated and said pressurized treatment liquid;

a pair of collecting means for collecting treated liquid, one of said collecting means being arranged along each of said major walls, sail plurality of injection means being spaced midway between said pair of collecting means, whereby liquid flowing from said injection means out of said apparatus is divided into two oppositely directed equal streams, one of said streams flowing toward each of said collecting means;

means operatively connected to said collecting means for evacuating said treated liquid from said apparatus;

removing means connected to said evacuating means for removing a predetermined portion of said treated liquid therefrom;

means connecting to said removing means for pressurizing said removed portion of said treated liquid; and means operatively positioned to supply said pressurized portion of said treated liquid to said plurality of injection means as said treatment liquid.

2. In a flotation apparatus for treating liquids by the use of a treatment liquid saturated with a gas under pressure, such gas expanding prior to its entry into the apparatus, said apparatus comprising;

a treatment tank of rectangular cross-section, said tank having a base, a pair of parallel opposite major walls, and a pair of parallel opposite minor walls;

a plurality of injection means, spaced uniformly along said base in a line equally spaced from and parallel to said major walls for introducing perpendicularly through said base and into said tank said liquid to be treated and said pressurized treatment liquid, each of said injection means comprising a vertically arranged open-top injection pot extending through said base, said injection pot having a circular horizontal cross-section, a main pipe means extending vertically into the bottom of said injection pot for delivering said liquid to be treated into said pot in a vertical stream and a lateral horizontal pipe means opening into said injection pot eccentrically and non-tangentially thereto for supplying said treatment liquid thereto in a stream which will not directly impinge on said vertical stream of liquid to be treated; and a pair of collecting means for collecting treated liquid, one of said collecting means being arranged along each of said major walls, said plurality of injection means being spaced midway between said pair of collecting means;

whereby liquid flowing from said injection means out of said apparatus is divided into two oppositely directed equal streams, one of said streams flowing toward each of said collecting means.

3. The device of claim 2, further comprising:

means operatively connected to said collecting means for evacuating said treated liquid from said apparatus;

means connected to said evacuating means for removing a predetermined portion of said treated liquid therefrom;

means connected to said removing means for pressurizing said removed portion of said treated liquid; and means operatively positioned to supply said pressurized portion of said treated liquid to said plurality of injection means as said treatment liquid.

* * * * *